United States Patent [19]
Kikuchi

[11] 3,781,019

[45] Dec. 25, 1973

[54] AUTOMATIC CONTINUOUS RECORD/PLAYBACK MEANS FOR TAPE CASSETTE LOADING TAPE RECORDER

[75] Inventor: Junjiro Kikuchi, Nagano, Japan

[73] Assignee: Sankyo Kogaku Koygo Kabushiki Kaisha, Suwa-shi, Nagano, Japan

[22] Filed: May 17, 1972

[21] Appl. No.: 254,208

Related U.S. Application Data

[63] Continuation-in-part of Ser. No. 15,096, Feb. 27, 1970, abandoned.

[30] Foreign Application Priority Data

Feb. 28, 1969 Japan ............................... 44-18659

[52] U.S. Cl. .................. 274/4 E, 274/4 C, 242/198

[51] Int. Cl. ............................................ G11b 5/00

[58] Field of Search ..................................................
242/198–200; 274/4 C, 4 D, 4 E, 11 C, 11 D; 179/100.2 Z

[56] References Cited

UNITED STATES PATENTS

| | | | |
|---|---|---|---|
| 3,127,178 | 3/1964 | Osborne | 274/4 F |
| 3,533,633 | 10/1970 | Wilder | 274/4 D |
| 3,604,714 | 9/1971 | Staar | 274/4 E |

*Primary Examiner*—Leonard D. Christian
*Attorney*—Eric H. Waters et al.

[57] ABSTRACT

An automatic continuous record/playback means for a cassette tape recorder in which a magnetic tape provided with a plurality of tape tracks may be used for continuous reproduction, without having to turn the tape cassette over either manually or automatically on a multi-track replay equipment that has two capstans and two pressure rollers. Reproduction of all tracks is obtained by reversing the direction of tape travel. The automatic continuous record/playback means of the present invention principally comprises a pair of opposed pressure rollers and an elongated rocker arm member supported at its center on the tape recorder housing in a freely rockable manner in opposite directions. A rocking movement of the lever member around its pivotal point in either desired direction causes a respective pressure roller to selectively make engagement with its co-operable capstan so that the tape is advanced in a selected direction of travel. Head channels in the magnetic head may be alternatively brought into co-operation with any one of tape tracks, selected in accordance with the direction of the tape movement.

7 Claims, 5 Drawing Figures

AUTOMATIC CONTINUOUS RECORD/PLAYBACK MEANS FOR TAPE CASSETTE LOADING TAPE RECORDER

CROSS RELATED APPLICATION

This application is a continuation-in-part of my earlier application Ser. No. 15,096 filed Feb. 27, 1970 now abandoned.

BRIEF SUMMARY OF THE INVENTION

The present invention relates to a cassette tape recorder, and more particularly, to automatic continuous record/playback means for a cassette tape recorder.

It is a primary object of the present invention to provide an automatic continuous playback means wherein a multi-track magnetic tape received in a twin-hub tape cassette may be used for continuous reproduction, without having to turn the cassette over between playing of tape tracks, viz. by only reversing the direction of tape movement.

It is another object of the present invention to provide automatic continuous play back means wherein any one of the pressure rollers is selectively permitted to make frictional engagement with its associated capstans, the capstans being driven in opposite directions to each other, to thereby reverse the direction of tape movement, while at the same time head channels on the magnetic head are alternatively shifted into cooperation with one of the tape tracks depending upon the direction of the tape travel.

It is still another object of the present invention to provide a cassette tape recorder which is provided with a lever mechanism that is especially constructed so as to perform automatic continuous sound-reproduction or playback.

These and other objects, features and advantages of the present invention will become apparent to those skilled in the art from the following description of the invention, in which no limitation is intended by the employed terminology and instead reference is made to the appended claims for a precise delineation of the true scope of the invention.

DETAILED DESCRIPTION

Figure 1:
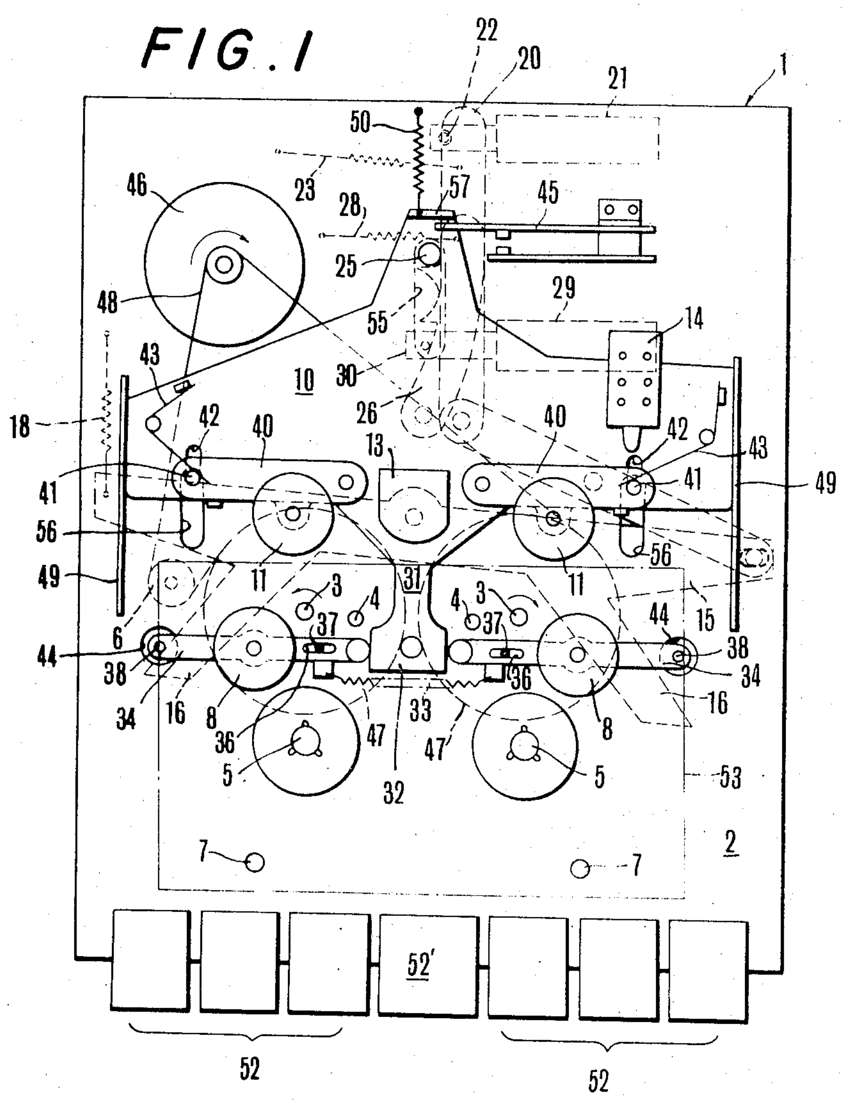
FIG. 1 is a schematic and explanatory plan view of a cassette tape recorder equipped with automatic continuous playback means in accordance with the present invention.

Referring firstly to FIG. 1, therein is shown a cassette tape recorder including an automatic continuous playback means constructed according to the present invention.

A housing of the tape recorder includes a top horizontal panel 2 which serves as a base member to load or support thereon a tape cassette 53 in a co-operative manner with tape recorder elements such as drive capstans, reel shafts and the like.

Protruding above the base member or top panel 2 are a pair of transversely opposed drive capstans 3, a pair of transversely opposed cassette-locating pins 7, a pair of cassette guiding pins 4 and a pair of reel shafts 5 which are adapted to fit respectively into hubs of a tape take-up reel and a tape delivery reel in the tape cassette. It will be understood that the drive capstans 3 are driven in opposite directions to each other from a motor 46 through an endless belt 48 which as shown in FIG. 1, is looped over the output shaft of the motor 46, pulleys 47 mounted on the capstans 3 and a tension pulley 6.

Idle pulleys 8 are each mounted in a freely rotational manner on transversely extended arm members 34 which are positioned between each of the capstans 3 and a respective reel shaft 5. A movable base member 10 is mounted on the upper half of panel 2 as viewed in FIG. 1, the movable base member 10 being supported for movement towards or away from a tape cassette 53 which has been laoded into its operative position in the base 2. The movable base member 10 is suitably provided with two pressure rollers 11, a magnetic head 13 and a head channel changing-over switch 14 which is adapted to selectively or alternatively switch over the head channels from one to another depending upon the direction of tape travel.

The movable base member 10 is supported at its transversely opposed side edges on a pair of transversely opposed, longitudinal-extended parallel guide rails 49 for longitudinally sliding movement. The base member 10 is urged by a resilient means such as a tension spring 50 away from the tape cassette 53 being loaded in its operative position, namely, towards the position in which the magnetic head 13 and pressure rollers 11 are out of co-operation with the exposed portion of the tape of the tape cassette 53. To forcibly move the movable base member 10 against the action of the tension spring 50 towards the tape cassette 53 being loaded, that is to say, towards the position in which the magnetic head 13 is in engagement with the active surface of the tape while one of the pressure rollers 11 is ready for engaging its associated capstan shaft, there is provided a linkage mechanism 51 on one of which is operatively connected to the movable base member 10, the opposite end being connected to a manually operable button 52'. The linkage mechanism 51 is so constructed that manual depression of the button 52' causes longitudinal movement of the movable base member 10 along the guide rails 49 against the action of the tension spring 50 towards the tape cassette 53 which has been brought into the operative position on the base 2 of the housing 1.

Further provided at the underside of the movable base member 10 in a downwardly projecting manner from the latter are a vertical pin 25 and a projection 57. The vertical pin 25 is fitted in an elongated slot 55 in the base 2 of the tape recorder housing 1 for freely sliding movement and it extends further downwardly so as to make engagement with lugs 24 and 27 (see FIGS. 2, 3 and 4) which are respectively provided on an operating lever 20 and a stopping lever 26 which will be hereinafter described in detail. On the other hand, the projection 57 is designed to actuate a master switch 45 for energization of motor 46 when the movable base member 10 has been shifted towards the loaded tape cassette.

Integrally formed at substantially the middle portion of the transverse edge of the movable base member 10 facing the tape cassette 53 is a cam member 31 which extends below the tape spring 50, 53. The cam member 31 terminates in an enlarged head portion 32 to form a hammer head in plan view. The two arm members 34 each having an idle pulley 8 mounted thereon for free rotation, are arranged transversely on opposite sides of the cam member 31. The arm members 34 are each provided at or in close vicinity to its inside edge with a slot 36 extended longitudinally in the arm member 34. The elongated slot 36 loosely receives therein a vertical pin 37 on the base 2 of the tape recorder housing 1 in such a manner that the arm member 34 may make linear movement along the slot 36 within the limited range there-of as well as pivotal movement about the pin 37. The arm members 34 are further biased, by means of a tension spring 33 connected therebetween, towards each other with the inntermost ends thereof yieldingly abutted against eitherside of the cam member 31. In this manner, when the movable base member 10 is moved away from the tape cassette 53 by means of the tension spring 50, the arm members 34 are each yieldingly abutted against either side of the enlarged head portion 32 of the cam member 31 so that they are outwardly moved against the action of the tension spring 33 in opposite directions to each other. The arm members 34 are each provided at the outermost ends thereof with a vertical pin 38 which is loosely fitted in an opening 44 in the base 2. The pins 38 are selectively engageable with respective transversely opposed legs 16 integral with a transversely extended rocker arm member 15 which is provided for reversing or changing over the direction of tape travel as will be explained later. The innermost ends of the arm members 34, yieldingly abutted against the cam member 31, are each rounded to permit angular relative movement thereof with respect to the cam member 31 around the pin 37.

The pressure rollers 11 are supported in freely rotational manner on respective arm members 40, which are in turn pivotally mounted at their inner ends on the movable base member 10. Provided at the outer ends of the arm members 40 are respective vertical pins 41 which each downwardly extend through a guide slot 42 in the movable base member 10 and further through an underlying slot 56 in the base 2 to a position where it may be in abutting relation against an opposite transverse edge of the rocker arm member 15. There are further provided resilient means 43 which are yieldingly engaged with the pins 41 respectively, to thereby yieldingly urge the arm members 40 into the position where their pressure rollers 11 are in co-operation with their associated capstans 3 respectively.

Just below the base 2 of the tape recorder housing 1, there is provided a lever mechanism by which any one of the two pressure rollers 11 pivotally mounted on the movable base member 10 are selectively and alternatively brought into engagement with its associated drive capstan 3 to reverse the direction of tape travel, while the head channels of the magnetic head 13 are changed over from one to the other of the tape tracks. The lever mechanism includes the transversely extending rocker arm member 15 which is pivotally supported at center pivot 12 on the underside of the base 2 for freely rocking movement. The center-pivoted rocker arm member 15 is integrally formed with the transversely opposed leg portions 16 which are each directed aslant with respect to the rocker arm member 15 or extended downwardly and outwardly as viewed in FIGS. 1 and 2, as two equal non-parallel sides of an isosceles trapezoid.

The legs 16 each have an outwardly facing edge surface adapted to come into engagement with the vertical pin 38 which is, as mentioned above, mounted on the outermost end of the arm member 34. The rocker arm member 15 is further connected at one end, for example, its left-hand end as viewed in FIG. 1, to a tension spring 18 anchored to the base 2. It will be thus understood that the rocker arm member 15 is normally urged in the clockwise direction in a rocking manner and positively held in a first tilted position as shown in FIG. 1. The opposite end of the rocker arm member 15 is pivotally connected, as shown at pivot 24 to one end of a link lever 19 which is in turn pivoted to the housing at 17 and pivotally connected at the outer end 35 thereof with the operating lever 20. The pivot 24 is free to travel in a slot 24' in arm member 15 so that relative movement is provided between rocker arm member 15 and lever 19. The operating lever 20 is normally urged or biased in a specific direction, for example, in a counter-clockwise direction as viewed in FIGS. 1 and 2, by means of a resilient spring 23 connected to lever 20.

The operating lever 20 is, however, locked against counterclockwise swinging movement by means of a pin 22 operatively connected to a solenoid 21. Energization of the solenoid 21 causes movement of the pin 22 to the right as viewed in FIGS. 1 and 2 to cause clockwise swinging movement of the operating lever 20 against the action of the resilient spring 23.

Figure 2:
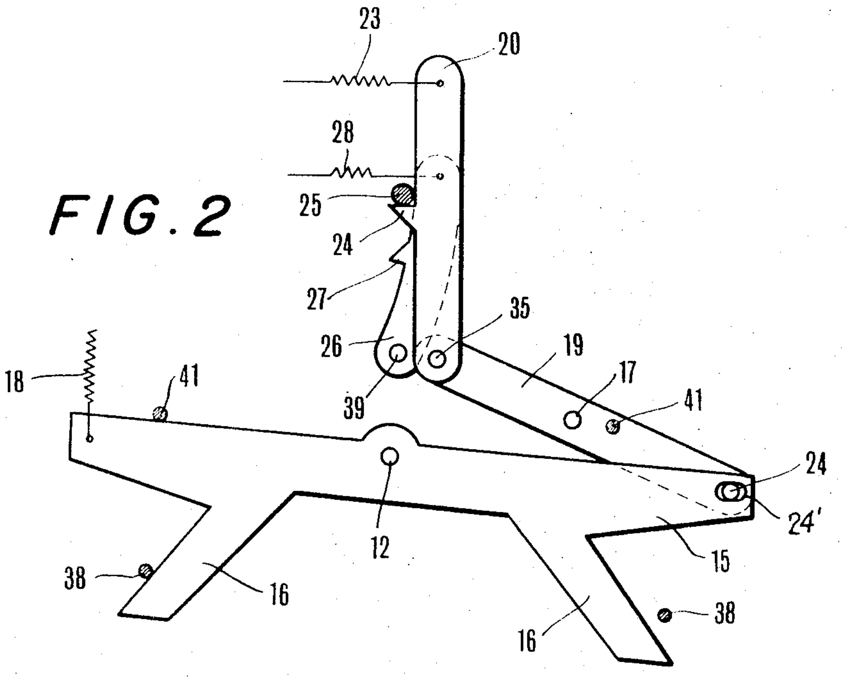
FIG. 2 is a schematic plan view of a lever mechanism adapted to reverse the direction of tape travel and in its particular position just before starting of a playback operation.

At the left lateral edge of lever 20 as viewed in FIGS. 1 and 2, there is provided lug 24 which is integral with and extending laterally from the operating lever 20. The lug 24 is, as described previously, located such that it can some into engagement with the vertical pin 25 extending downwardly from the underside of the movable base member 10. As seen particularly in FIGS. 2, 3 and 4, the lug 24 is of a triangular configuration in plan view and includes a first side, as viewed in FIGS. 2 to 4, so oriented that it makes a right angle with the left lateral edge of the operating lever 20, and a second side as viewed in FIGS. 2 to 4, so oriented that it forms an obtuse angle with the left lateral edge of the operating lever 20. Thus, the vertical pin 25 of the movable base member 10, when being driven against the first side of the lug 24, is positively engaged with the lug 24 so that the operating lever 20 is carried longitudinally of the tape recorder housing 1 with the movable base member 10. On the contrary, the vertical pin 25, when forced against the second side of the lug 24, the pin easily passes over the lug 24 so that the movable base member 10 causes no movement of the operating lever 20. Mounted just below the operating lever 20 is stopping lever 26 which extends in substantially parallel relation with the operating lever 20. The stopping lever 26 is pivotally mounted at pin 39 to the base 2 and normally urged by means of resilient spring 28 in the same direction as the operating lever 20, that is to say, in a counterclockwise direction as viewed in FIGS. 2 to 4.

Figure 3:
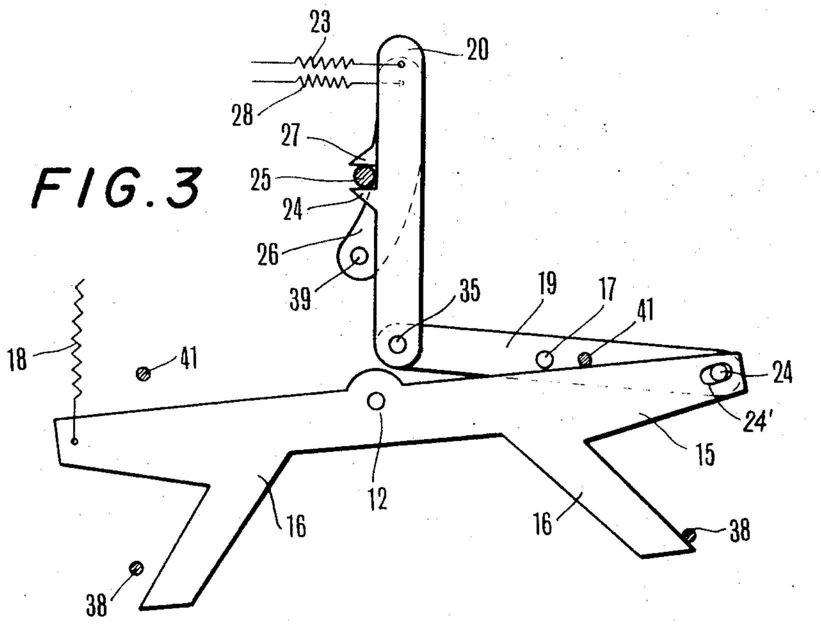
FIG. 3 is a view similar to FIG. 2, with the parts thereof being shown disposed in a different condition where the left-hand pressure roller, as viewed in FIG. 1, is engaged with its associated capstan so that the magnetic tape is advanced towards the left, as viewed in FIG. 1, with any one of the tape tracks being in playback mode.
Figure 4:
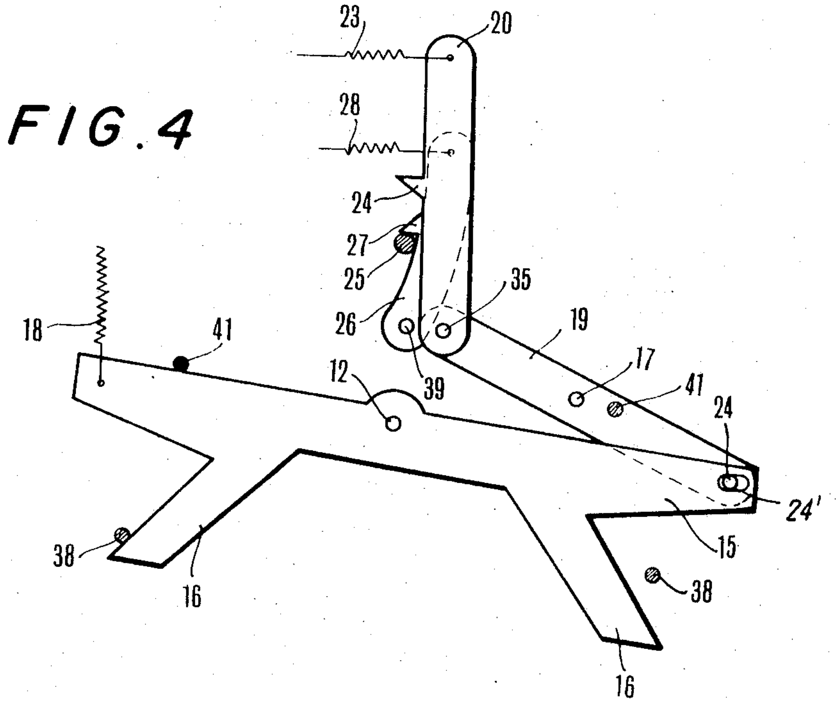
FIG. 4 is a view similar to FIG. 2, but showing a still another condition where the right-hand pressure roller, as viewed in FIG. 1, is engaged with its associated capstan so that the tape is fed in the reversed direction for playback of the other of the tape tracks on the tape.
Figure 5:
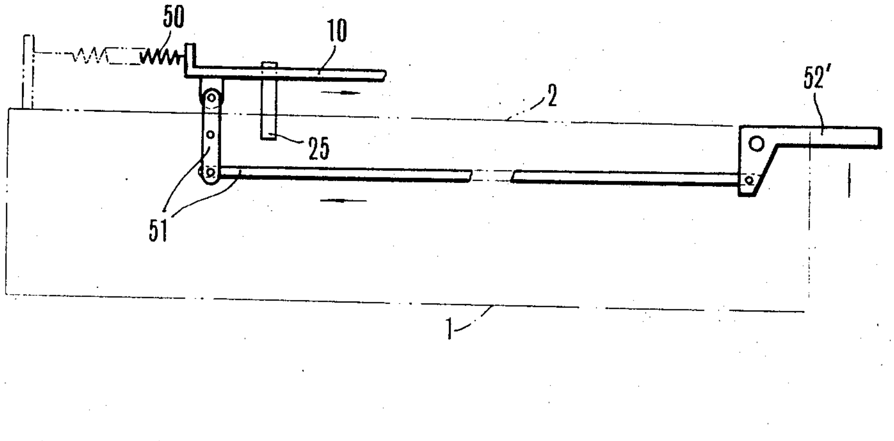
FIG. 5 is a schematic view illustrating a linkage mechanism adapted to shift a movable base member, on which are mounted a magnetic head and two transversely-opposed pressure rollers, towards a tape cassette which has been loaded into the tape recorder.

On the left edge of the stopping lever 26 as viewed in FIGS. 2 to 4, there is provided a lug 27 which is integral with and extends laterally from the stopping lever 26. The lug 27 has a configuration which is substantially symmetrical in plan view with the lug 24 of the operating lever 20 with respect to a horizontal line as viewed in FIGS. 2 to 4. That is to say, the lug 27 of the stopping lever 26 is of a triangular configuration in plan view and includes a first side which forms an obtuse angle with the lateral edge of the stopping lever 26, a second side which forms a right angle with the left lateral edge of the stopping lever 26.

In operation, the tape cassette 53 is firstly set or loaded upon the base 2 of the tape recorder housing 1 and, at this time, the various parts and elements of the tape recorder are in their positions or attitudes as shown in FIGS. 1 and 2. Then, the push button 52 is manually depressed to move or advance the movable base member 10 through the link mechanism 51 towards the cassette 53 until the magnetic head 13 is brought into engagement with the exposed tape portion. Meanwhile, the vertical pin 25 affixed to the movable base member 10 is forcibly pushed against the lug 24 of the operating lever 20 which, in turn, causes the link lever 19 to undergo counter clockwise-rocking movement around its center pivot 17 with the result that the rocker arm member 15 is rocked in the counterclockwise-direction against the action of the tension spring 18, namely, the rocker arm member 15 is urged from its position as shown in FIG. 2 to the position as shown in FIG. 3.

Such counterclockwise-rocking movement of the rocker arm member 15 causes swinging movement of the pin 41, mounted on the right-hand arm member 40 as viewed in FIG. 1, against the opposition of its associated resilient means 43 in the direction shown by the arrow in FIG. 3. In this manner, the pressure roller 11 mounted on the right-hand arm member 40 is moved away from its associated capstan shaft 3. The opposite or left-hand pressure roller 11 is released from the rocker arm member 15 and urged into engagement with its associated capstan shaft 3 by the action of the resilient means 43 acting on the left-hand roller 11.

Simultaneously with these operations and movements, the arm members 34, which have been yieldingly abutted at their innermost ends against the enlarged head portion 32 of the cam member 31 by means of the intermediate tension spring 33 are shifted into engagement with the neck portion of the cam member 31 as the movable base member 10 advances towards the tape cassette 53. The movement of rocker arm member 15 in the counterclockwise direction as mentioned above causes the right-hand leg 16, as viewed in FIGS. 2 to 4 to come into engagement with pin 38 to push the pin further to the right so that the idle pulley 8 mounted on the arm member 34 is completely prevented from being brought into engagement with the capstan shaft 3 and the reel shaft 5 which are both arranged at the right-hand side of the tape recorder housing 1, as viewed in FIG. 1. Consequently, only the left-hand arm member 34 as viewed in FIG. 1 is moved transversely (to the right) into engagement with the neck portion of the cam member 31 whereby the idle pulley 8 on the left-hand arm member 34 is brought into co-operation with its associated capstan and reel shaft to feed or drive the magnetic tape in a counterclockwise direction during playback or reproduction of one tape track.

Upon completion of one playback operation, an ending signal provided at the end of the tape serves to energize the solenoid 21 which in turn causes the operating lever 20 to rotate against the action of tension spring 23 in the clockwise direction so that the vertical pin 25 of the movable base member 10 is released from engagement with the lug 24 of the operating lever 20. Thereupon, the rocker arm member 15 is freely moved by the tension spring 18 in the clockwise direction into the condition as shown in FIG. 4. Meanwhile, the left-hand leg 16 of the rocker arm member 15, comes into engagement with the pin 38 on the left-hand arm member 34 which is thus urged or moved to the left transversely of the housing 1 against the action of tension spring 33 so that the idle pulley 8 on the left-hand arm member 34 is moved away from engagement with its associated capstan 3 and reel shaft 5. On the contrary, the pin 38 of the right-hand arm member 34 is released from the right-hand leg 16 of the rocker arm member 15 whereby this right-hand arm member 34 is freely moved to the left by means of the tension spring 33 until its leftmost or innermost end is yieldingly abutted against the neck portion of the cam member 31 to produce engagement of the right-hand idle pulley 8 with its associated capstan 3 and reel shaft 5.

Now considering the behavior of the pressure rollers 11, the above-mentioned clockwise movement of the rocker arm member 15 simultaneously causes engagement with pin 41 to make the lefthand arm member 40 pivot in the clockwise direction, thus moving the left-hand pressure roller 11 away from its co-operative capstan 3. At the same time, the right-hand arm member 40 is released from the rocker arm member 15 so that the right-hand pressure roller 11 is placed into engagement with its associated capstan, thereby automatically reversing the direction of tape travel to play back another tape track.

It will be frequently required to reverse the direction of tape travel in the course of a playback operation. Assuming that the tape recorder parts are in the condition as shown in FIG. 3, the tape travel may be easily and speedy reversed only by manual operation of a suitable push button to energize the solenoid 21. That is to say, the energization of the solenoid 21 causes the lug 24 of the operating lever 20 to disengage the vertical pin 25 of the movable base member 10 whereby the lever mechanism is smoothly brought to the condition as shown in FIG. 4. There may be further provided a suitable means (not shown) to change over the operating lever 20 from its second condition shown in FIG. 4 to the first condition shown in FIG. 3.

To discontinue the playback or reproduction, it is only required to energize a solenoid 29 through a manual operation of a suitable push button with the result of rotation of swinging movement of the stopper lever 26 in the direction where the vertical pin 25 of the movable base member 10 is released from the lug 27 of the stopper lever 26.

Thus, there is provided in accordance with the present invention, automatic continuous playback means wherein a multi-track magnetic tape received in a twin-hub tape cassette may be used for continuous reproduction, without having to turn the cassette over between the playing of tape tracks, only by reversing the direction of tape movement.

While there have been shown and described the fundamental novel features of the invention as applied to a preferred embodiment, it will be understood that various omissions, substitutions and modifications in the form and details may be made by those skilled in the art without departing from the spirit of the invention as defined by the appended claims.

What is claimed is:

1. For use in combination with a tape recorder having a housing in which a cassette can be loaded and unloaded: a pair of transversely opposite capstans driven in opposite directions to one another, a pair of transversely opposite reel shafts, a pair of transversely opposite idle pulleys each arranged between each set of capstan and reel shafts, and a movable base member adapted to be moved in said housing between operative and inoperative positions, said movable base member including thereon a magnetic head, a head channel-switching means, and a pair of transversely opposite pressure rollers; tape travel-reversing means comprising a pair of transversely opposite arm members pivotally mounted on said movable base member and respectively mounting said pressure rollers thereon for free rotation, resilient means acting on said arm members to urge the same yieldingly so that said pressure rollers are brought into engagement with their associated capstans, a pair of further transversely opposite arm members loosely mounted with respect to said base member for linear and rotational movement and mounting respective of said idle pulleys thereon for free rotation, further resilient means acting on the latter said arm members to urge the same in a direction in which said idle pulleys each come into engagement with its associated reel shaft and capstan, a pivotal rocker arm member extending transversely of the base member, said rocker member having first and second positions, said rocker arm member having first and second longitudinal edges and including at the first longitudinal edge a pair of transversely opposite legs integral with and protruding laterally outwardly from said rocker arm member, said pressure roller-supporting arm members each having a free end with a pin extending downwardly thereat and facing the second longitudinal edge of said rocker arm member such that, upon rocking movement of said rocker arm member from one position to the other, one of said pressure rollers is urged away from its associated capstan while the other pressure roller is released to freely move towards its associated capstan under the action of the associated resilient means, said supporting arm members for the idle pulleys including respective pins which face said legs in such relation that, upon rocking movement of said rocker arm member from one position to the other, one of said idle pulleys is urged away from its associated capstan and reel shaft while the other idle pulley is released so as to freely move into engagement with its associated capstan and reel shaft under the action of the associated resilient means, a tension spring connected to said rocker arm member at one end thereof to bias said rocker arm member to the first position, and means connected to the other end of said rocker arm member to pivotably move the latter from said first position to the second position, the latter means comprising a link lever pivotably connected at an intermediate location to said housing and connected at one end for pivotal movement to said other end of said rocker arm member, and an operating lever having one and pivotally connected to the other end of said link lever, said operating lever having a laterally-projecting lug at a lateral longitudinal edge thereof, said movable base member including a depending pin which is arranged such that, when the movable base member is moved towards said tape cassette to bring said magnetic head and pressure rollers into cooperation with an exposed tape portion and the capstans, said vertical pin engages said lug of said operating lever to turn said rocker arm member through said link lever to said second position, and means for disengaging said lug of the operating lever and the depending pin on the movable base member to enable said rocker arm member to be yieldingly returned to its first position by the action of said tension spring.

2. The combination as claimed in claim 1 wherein said means for disengaging said lug of the operating lever and the depending rib on the movable base member comprises resilient means urging said operating lever into abutment with said depending pin on said movable base member, and a solenoid-operative actuator means which, upon energization of a solenoid, causes said operating lever to pivotally move against the action of the last said resilient means in a direction in which said laterally projecting lug of said operating lever is out of engagement with said depending pin.

3. The combination as claimed in claim 1 comprising a stopping lever mounted just below said operating lever and extending in substantially parallel relation to the latter, said stopping lever being pivotally mounted to said housing, said stopping lever being rotatingly biased in the same direction as said operating lever, the stopper lever including a laterally projecting lug at the same side edge thereof corresponding to that of the operating lever from which its leg projects, said lug on the stopping lever having a triangular configuration in plan and having a first side which is arranged so that said depending pin on the movable base member, when being thrust against said first side, may clear said lug by slightly rocking said stopping lever, said lug on the stopping lever also having a second side which is so arranged to prevent said depending pin on the movable base member, once having cleared said lug of the stopping lever, from being returned to its initial position.

4. The combination as claimed in claim 3 comprising a second solenoid-operative actuator means which, upon energization of a second solenoid, causes said stopping lever to pivotally move in a direction in which the lug of the stopping lever is out of engagement with said depending pin of said movable base member whereby said movable base member is released for free movement.

5. The combination as claimed in claim 1 comprising a tension spring acting on said movable base to yieldingly urge the base to move away from the loaded tape cassette, a manually operable button, and a link mechanism connecting the button and base member to move the base member against opposition of said tension spring towards the loaded tape cassette.

6. The combination as claimed in claim 1 wherein said housing encloses the base member, all the arm members, all the resilient means, and all the levers.

7. The combination as claimed in claim 6 wherein said rocker arm member is pivotably connected to the housing.

* * * * *